United States Patent
Chung et al.

(10) Patent No.: US 11,608,413 B2
(45) Date of Patent: Mar. 21, 2023

(54) POLYTRIMETHYLENE ETHER GLYCOL AND PREPARATION METHOD THEREOF

(71) Applicant: SK CHEMICALS CO., LTD., Gyeonggi-do (KR)

(72) Inventors: Jae-Il Chung, Gyeonggi-do (KR); Hyun Jun Cho, Gyeonggi-do (KR); Han-Seok Kim, Gyeonggi-do (KR); Deug-Soo Kim, Gyeonggi-do (KR)

(73) Assignee: SK Chemicals Co., Ltd.

( * ) Notice: Subject to any disclaimer, the term of this patent is extended or adjusted under 35 U.S.C. 154(b) by 329 days.

(21) Appl. No.: 16/647,752

(22) PCT Filed: Sep. 11, 2018

(86) PCT No.: PCT/KR2018/010630
§ 371 (c)(1),
(2) Date: Mar. 16, 2020

(87) PCT Pub. No.: WO2019/066310
PCT Pub. Date: Apr. 4, 2019

(65) Prior Publication Data
US 2020/0277437 A1   Sep. 3, 2020

(30) Foreign Application Priority Data
Sep. 29, 2017   (KR) .................. 10-2017-0128260

(51) Int. Cl.
*C08G 65/46* (2006.01)
*C08G 65/34* (2006.01)

(52) U.S. Cl.
CPC ............. *C08G 65/46* (2013.01); *C08G 65/34* (2013.01)

(58) Field of Classification Search
CPC .................. C08G 65/46; C08G 65/34
See application file for complete search history.

(56) References Cited

U.S. PATENT DOCUMENTS

| | | | |
|---|---|---|---|
| 3,925,484 A | 12/1975 | Baker | |
| 5,282,929 A | 2/1994 | Dorai et al. | |
| 5,302,255 A | 4/1994 | Dorai et al. | |
| 6,562,457 B1 | 5/2003 | Goldfinger et al. | |
| 6,852,823 B2 | 2/2005 | Sunkara et al. | |
| 6,977,291 B2 | 12/2005 | Sunkara et al. | |
| 7,157,607 B1 | 1/2007 | Sunkara et al. | |
| 7,745,668 B2 | 6/2010 | Sunkara et al. | |
| 8,884,073 B2 | 11/2014 | Muliawan et al. | |
| 2002/0007043 A1* | 1/2002 | Sunkara | C08G 65/34 528/396 |
| 2006/0065600 A1 | 3/2006 | Sunkara et al. | |
| 2012/0277478 A1 | 11/2012 | Muliawan et al. | |
| 2017/0240701 A1 | 8/2017 | Moon et al. | |

FOREIGN PATENT DOCUMENTS

| | | |
|---|---|---|
| EP | 1246861 | 5/2006 |
| JP | H07-505178 | 6/1995 |
| JP | 2003-517071 | 5/2003 |
| JP | 2005-535744 | 11/2005 |
| JP | 2009-504880 | 2/2009 |
| JP | 2014-518852 | 8/2014 |
| KR | 10-0233797 | 12/1999 |
| KR | 10-0677809 | 2/2007 |
| KR | 10-2008-0035697 | 4/2008 |
| KR | 10-2014-0038423 | 3/2014 |
| KR | 10-2016-0047218 | 5/2016 |
| WO | WO 93/18083 | 9/1993 |

OTHER PUBLICATIONS

Harmer et al. "Renewably sourced polytrimethylene ether glycol by superacid catalyzed condensation of 1,3-propanediol," Green Chemistry, Aug. 2010, vol. 12, No. 8, pp. 1410-1416.
Extended Search Report for European Patent Application No. 18860759.2, dated Jun. 17, 2021, 7 pages.
International Search Report and Written Opinion for International (PCT) Patent Application No. PCT/KR2018/010630, dated Dec. 18, 2018, 10 pages.

* cited by examiner

*Primary Examiner* — Vishal V Vasisth
(74) *Attorney, Agent, or Firm* — Sheridan Ross P.C.

(57) ABSTRACT

Provided are a polytrimethylene ether glycol and a preparation method thereof, wherein various by-products and oligomers may be effectively removed from a polytrimethylene ether glycol product without exposing to a high temperature for a long period of time, and therefore, a molecular weight variation may be reduced due to the removal of various by-products and low molecular weight oligomers.

8 Claims, No Drawings

POLYTRIMETHYLENE ETHER GLYCOL AND PREPARATION METHOD THEREOF

CROSS-REFERENCE TO RELATED APPLICATION(S)

This application is a national stage application under 35 U.S.C. 371 and claims the benefit of PCT Application No. PCT/KR2018/010630 having an international filing date of Sep. 11, 2018, which designated the United States, which PCT application claims the benefit of priority from Korean Patent Application No. 10-2017-0128260 filed on Sep. 29, 2017, the disclosures of each of which are incorporated herein by reference in their entireties.

TECHNICAL FIELD

The present invention relates to a polytrimethylene ether glycol and a preparation method thereof.

BACKGROUND ART

Polytrimethylene ether glycol (PO3G), which is an ether polyol based on oxetene or 1,3-propanediol (1,3-PDO), may impart differentiated properties to polyurethane due to its unique crystal structure. Polyurethane, to which PO3G showing excellent mechanical properties compared to high elastic resilience is applied, may be employed in different application fields from those of existing polyether polyols such as PEG (polyethylene glycol), PPG (polypropylene glycol), PTMG (polytetramethylene glycol), etc., and thus many studies have been conducted on polyurethane.

A method of preparing polytrimethylene ether glycol is largely divided into two methods. One method is to prepare polytrimethylene ether glycol by ring-opening polymerization of oxetene. Although this method is a simple method, commercialization cannot proceed due to instability of the raw material, and therefore, the method still remains in the field of study.

The other method is to prepare polytrimethylene ether glycol from 1,3-propanediol by condensation polymerization. This method is rather complicated, as compared with the method of preparing polytrimethylene ether glycol by ring-opening polymerization of oxetene, but the preparation may be performed under relatively mild polymerization conditions. Documents that disclose this method are exemplified by U.S. Pat. Nos. 6,977,291 and 7,745,668.

Meanwhile, the preparation of polytrimethylene ether glycol from 1,3-propanediol by condensation polymerization, as described in the above patents, generates several problems. First, since the condensation polymerization is to react 1,3-propanediol in the presence of an acid catalyst for a long time, various by-products and low molecular weight oligomers are also produced. These materials have polarity different from that of polytrimethylene ether glycol and exhibit a localized distribution, which causes variations in a molecular weight distribution and a molecular weight.

Further, since most of the by-products are aldehyde-based by-products, they have unpleasant odors in themselves, and also adversely affect the color of polytrimethylene ether glycol and a reaction rate and selectivity in a post-processing reaction, and form 1,3-propanediol and cyclic oligomers. The cyclic oligomers are mainly attributed to a molecular structure of 1,3-propanediol. Similarly, in the preparation of a polyester PTT by using 1,3-propanediol, cyclic oligomers are excessively produced due to the molecular structure of 1,3-propanediol, and they cause many problems in a polymerization degree of the polymer and final processing. In order to effectively remove the cyclic oligomers, a solid-phase polymerization process is often applied. Even in the case of polytrimethylene ether glycol, the remaining cyclic oligomers may cause deterioration of mechanical properties of an article produced using the same, and furthermore, may cause migration to the surface of the article.

Therefore, after preparation of polytrimethylene ether glycol from 1,3-propanediol by condensation polymerization, it is necessary to purify the polytrimethylene ether glycol in order to remove various by-products and oligomers from the product. For this purpose, it is generally considered to apply a distillation process. However, there is a problem in that when polyol polymers such as polytrimethylene ether glycol are exposed to a high temperature for a long period of time, thermal oxidation occurs.

Accordingly, the present inventors have made extensive efforts to study a method of purifying polytrimethylene ether glycol without exposing to a high temperature for a long period of time, and as a result, they found that when distillation of particular conditions is applied as described below, the above problems may be solved, thereby completing the present invention.

DISCLOSURE

Technical Problem

The present invention provides a method of preparing a polytrimethylene ether glycol, wherein various by-products and oligomers may be removed from the polytrimethylene ether glycol product without exposing to a high temperature for a long period of time, and a polytrimethylene ether glycol prepared by the method.

Technical Solution

In order to achieve the above objects, the present invention provides a polytrimethylene ether glycol having a molecular weight distribution (Mw/Mn) of 1.8 to 2.1, wherein a content of oligomers having a number average molecular weight of 400 or less is 0.5 wt % or less.

When polytrimethylene ether glycol is prepared from 1,3-propanediol by condensation polymerization, polytrimethylene ether glycol having a wide molecular weight distribution is produced, and various by-products and low molecular weight oligomers are also produced. The wide molecular weight distribution is mainly attributed to the produced oligomers, which causes variation in physical properties of an article produced using the polytrimethylene ether glycol, thereby limiting application fields of the polytrimethylene ether glycol. Further, since most of the various by-products are aldehyde-based compounds, they adversely affect physical properties of polytrimethylene ether glycol, have unpleasant odors in themselves, and also adversely affect a reaction rate and selectivity in a post-processing reaction of using the polytrimethylene ether glycol and color of the polytrimethylene ether glycol.

Therefore, it is necessary to purify the polytrimethylene ether glycol which is prepared from 1,3-propanediol by condensation polymerization. For this purpose, polytrimethylene ether glycol is generally purified through a distillation process. However, in the purification process, polytrimethylene ether glycol is allowed to remain at a high temperature for a long period of time, which generates a problem of thermal oxidation.

Accordingly, the present invention provides a method of purifying polytrimethylene ether glycol without exposing polytrimethylene ether glycol to a high temperature for a long period of time by applying a distillation process as described below. Further, through this method, various by-products and low molecular weight oligomers may be removed, and as a result, the purified polytrimethylene ether glycol may have a narrow molecular weight distribution, thereby reducing the molecular weight variation.

Further, in the polytrimethylene ether glycol according to the present invention, a content of oligomers having a number average molecular weight of 400 or less is 0.5 wt % or less, preferably, 0.4 wt % or less, 0.3 wt % or less, 0.2 wt % or less, or 0.1 wt % or less.

Further, in the polytrimethylene ether glycol according to the present invention, a content of 1,3-propanediol is 100 ppmw or less, preferably, 90 ppmw or less, 80 ppmw or less, 70 ppmw or less, 60 ppmw or less, 50 ppmw or less, or 40 ppmw or less.

Further, in the polytrimethylene ether glycol according to the present invention, a content of aldehyde is 300 ppmw or less, preferably, 200 ppmw or less, 150 ppmw or less, 100 ppmw or less, 90 ppmw or less, 80 ppmw or less, 70 ppmw or less, 60 ppmw or less, 50 ppmw or less, or 40 ppmw or less. The aldehyde refers to a compound including an aldehyde group, and may be measured by analysis of a carbonyl group, as described in Example.

Further, a number average molecular weight of the polytrimethylene ether glycol according to the present invention is 400 to 4,000.

Further, the present invention provides a method of preparing the above-described polytrimethylene ether glycol, the method including the following steps of:

preparing a product comprising polytrimethylene ether glycol by polymerizing 1,3-propanediol (Step 1); and preparing purified polytrimethylene ether glycol by distilling the product under conditions of a temperature of 150° C. to 250° C. and a pressure of 0.001 torr to 2.0 torr (Step 2).

Hereinafter, each step of the present invention will be described in detail.

Step of Preparing Polytrimethylene Ether Glycol (Step 1)

Step 1 of the present invention is a step of preparing a product including polytrimethylene ether glycol by polymerizing 1,3-propanediol.

Reaction conditions of Step 1 are not particularly limited, as long as polytrimethylene ether glycol is prepared from 1,3-propanediol under the reaction conditions. Preferably, polytrimethylene ether glycol is prepared by performing polycondensation of 1,3-propanediol using a polycondensation catalyst.

Specifically, the polycondensation catalyst is selected from the group consisting of Lewis acids, Bronsted acids, super acids, and mixtures thereof. More preferably, the catalyst is selected from the group consisting of inorganic acids, organic sulfonic acids, heteropolyacids, and metal salts. Most preferably, the catalyst is selected from the group consisting of sulfuric acid, fluorosulfonic acid, phosphorous acid, p-toluenesulfonic acid, benzenesulfonic acid, phosphotungstic acid, phosphomolybdenic acid, trifluoromethanesulfonic acid, 1,1,2,2-tetrafluoro-ethanesulfonic acid, 1,1,1,2,3,3-hexafluoropropanesulfonic acid, bismuth triflate, yttrium triflate, ytterbium triflate, neodymium triflate, lanthanum triflate, scandium triflate, and zirconium triflate. The catalyst is also selected from the group consisting of zeolites, fluorinated alumina, acid-treated silica, acid-treated silica-alumina, heteropolyacids, and heteropolyacids supported on zirconia, titania, alumina, and/or silica. More preferably, sulfuric acid is used as the polycondensation catalyst.

The catalyst is preferably used at a concentration of 0.1 wt % to 20 wt %, and more preferably, 1 wt % to 5 wt %, based on the weight of the reaction mixture.

Further, the polycondensation is preferably performed at 150° C. to 250° C., and more preferably, at 160° C. to 220° C. Further, the reaction is preferably performed in the presence of inert gas, and preferably, under nitrogen gas.

After the condensation polymerization, a hydrolysis reaction may be further performed in order to remove the acid binding to polytrimethylene ether glycol. Further, the hydrolysis reaction may be followed by a neutralization reaction.

Step of Distilling (Step 2)

Step 2 of the present invention is a step of removing various by-products and low molecular weight oligomers by distilling the product of Step 1.

As described above, when polytrimethylene ether glycol is distilled by retaining it at a high temperature for a long period of time, a problem of thermal oxidation may be generated, and therefore, the present invention is characterized in that purification is performed at a relatively low temperature for a short time.

To this end, the distillation is preferably performed by thin film evaporation, falling film evaporation, or short path evaporation, in which a thin film evaporator, a falling film evaporator, or a short path evaporator is used, respectively. In the distillation, the mixture to be separated is prepared into a thin film to increase the surface area thereof which will be in contact with a heat source. For example, in the case of thin film evaporation, the mixture introduced into the thin film evaporator forms a thin film on the inner wall of the thin film evaporator by a physical force (e.g., wiper), and heat at an appropriate temperature is applied thereto through the heat source (e.g., heating media) to perform distillation. When an internal pressure of the thin film evaporator is decreased, a vapor pressure of the material is decreased, and thus it is advantageous in that evaporation takes place at a temperature lower than its original boiling point. Further, a condenser for recovering the evaporated materials may be provided inside the thin film evaporator.

Further, when the distillation is employed, it is advantageous in that the mixture to be separated may be continuously applied. Specifically, the mixture to be separated may be continuously introduced into the upper portion of the evaporator, and the purified mixture may be recovered in the lower portion of the evaporator.

Meanwhile, in the present invention, for the distillation, the product of Step 1 is distilled under conditions of a temperature of 150° C. to 250° C. and a pressure of 0.001 torr to 2.0 torr.

The temperature is a temperature for the distillation, and may be controlled through the heat source (e.g., heating media) which is provided in the outer wall of the evaporator. When the temperature is lower than 150° C., there is a problem in that the effect of distillation is insufficient, and thus it is difficult to remove various by-products and low molecular weight oligomers. When the temperature is higher than 250° C., there is a problem in that thermal oxidation of polytrimethylene ether glycol may occur. Preferably, the temperature is 160° C. or higher, or 170° C. or higher, and 240° C. or lower, 230° C. or lower, or 220° C. or lower.

Further, the pressure is an internal pressure of the evaporator to lower the vapor pressure of the material to be separated, and may be controlled through, for example, a vacuum pump connected to the inside of the evaporator.

When the pressure is lower than 0.001 torr, there is a problem in that it is difficult to maintain the pressure, and the vapor pressure of each material is excessively reduced to decrease the separation efficiency. Further, when the pressure is higher than 2.0 torr, there is a problem in that the vapor pressure of each material is slightly reduced to decrease the separation efficiency. Preferably, the pressure is 0.005 torr or higher, or 0.01 torr or higher, and 1.5 torr or lower, 1.0 torr or lower, 0.9 torr or lower, 0.8 torr or lower, 0.7 torr or lower, 0.6 torr or lower, 0.5 torr or lower, 0.4 torr or lower, 0.3 torr or lower, 0.2 torr or lower, or 0.1 torr or lower.

Meanwhile, various by-products and low molecular weight oligomers evaporated in the evaporator may be discharged from the lower portion of the evaporator through the condenser, thereby separately recovering the remaining purified mixture.

There is an effect that various by-products and low molecular weight oligomers are removed from the purified polytrimethylene ether glycol prepared by the above-described preparation method of the present invention.

Due to the above effect, the purified polytrimethylene ether glycol has a narrow molecular weight distribution and a lowed content of low molecular weight oligomers and various by-products, as compared with the product of Step 1, and furthermore, there is a small variation in the number average molecular weight of the purified polytrimethylene ether glycol.

As in Examples described below, when the polytrimethylene ether glycol prepared in Step 1 was aliquoted in a predetermined amount to prepare several samples, and these samples were analyzed, there was a large variation of the number average molecular weight between the samples, whereas the distillation of Step 2 significantly reduced the variation between the samples.

Accordingly, in the present invention, various by-products may be removed and polytrimethylene ether glycol having a uniform number average molecular weight may be prepared.

Effect of the Invention

As described above, a polytrimethylene ether glycol and a preparation method thereof according to the present invention are characterized in that various by-products and oligomers may be effectively removed from a polytrimethylene ether glycol product without exposing to a high temperature for a long period of time, and therefore, a molecular weight variation may be reduced due to the removal of various by-products and low molecular weight oligomers.

DETAILED DESCRIPTION OF THE EMBODIMENTS

Hereinafter, preferred Examples will be provided for better understanding of the present invention. However, the following Examples are for illustrative purposes only, and the scope of the present invention is not intended to be limited by the following Examples.

Example (Step 1)

A 20 L double jacketed reactor was packed with 1,3-propanediol (15 kg) and sulfuric acid (150 g), and heated at 166±1° C. under nitrogen for 35 hours to prepare a polymer, and by-products were removed through an upper condenser.

Viscosity of the prepared polymer was measured as 2300 cps (at 25° C.). Thereafter, deionized water (5 kg) was added, and a produced mixture was maintained under nitrogen at 95° C. for 4 hours to hydrolyze acid ester formed during polymerization. After hydrolysis, 124 g of $Ca(OH)_2$ in 1000 mL of deionized water was added, and the mixture was heated at 80° C. while stirring under a nitrogen stream. Neutralization was continued for 3 hours, and subsequently, the product was dried at 110° C. under reduced pressure for 2 hours, and filtered using a Nutche filter to obtain a total of 8.7 kg of polytrimethylene ether glycol product.

Each 1 kg of nine samples (#1~9) was prepared by aliqouting the above product, and the following physical properties were measured for the samples, respectively.

(1) OHV and End-Group Average Molecular Weight (Mn)

6 g of the polytrimethylene ether glycol prepared in Example and 15 mL of an acetylation reagent (acetic anhydride/pyridine=10/40 vol %) were introduced into a 100 mL flask, and reacted at 100° C. for 30 minutes under reflux. After reaction, the mixture was cooled at room temperature, and 50 mL of pure water was introduced thereto. The prepared reactant was subjected to titration reaction with KOH having a normal concentration of 0.5 using an automatic titrator (manufacturer: metronome, Titrino 716). OHV was calculated according to the following Mathematical Equation 1.

$$OHV = 56.11 \times 0.5 \times (A-B)/\text{feed amount of sample} \quad \text{[Mathematical Equation 1]}$$

wherein 56.11 represents a molecular weight of KOH, 0.5 represents a normal concentration of KOH, A represents a dispensed amount of a NaOH solution used in a blank test, and B represents a dispensed amount of a NaOH solution used in sample titration.

The measured OHV was converted into an end-group average molecular weight (Mn) according to the following Mathematical Equation 2.

$$Mn = (56.11 \times 2/OHV) \times 1000 \quad \text{[Mathematical Equation 2]}$$

wherein 56.11 represents a molecular weight of KOH, and

2 Represents the Number of Functional Groups of PO3G.

(2) Molecular weight distribution (Mw/Mn) and Oligomer content (wt %)

The polytrimethylene ether glycol prepared in Example was dissolved at a concentration of 1% by weight in THF (tetrahydrofuran), and a weight average molecular weight (Mw) and a number average molecular weight (Mn) were calculated by gel permeation chromatography (manufacturer: WATERS, model: Alliance, Detector: 2414 RI Detector, Column: Strygel HR 0.5/1/4) using polyethylene glycol as a standard material. From the measured Mw and Mn, a molecular weight distribution value and a content of low molecular weight oligomers having Mn of 400 or less were calculated.

(3) Carbonyl Content (Carbonyl Value; ppmw)

The polytrimethylene ether glycol prepared in Example was dissolved at a concentration of 1% by weight in methanol, and measured by UV spectrometry (manufacturer: Varian, model: Cary300). A carbonyl content was determined according to a calibration data obtained by converting the measured carbonyl absorbance into 2,4-dinitrophenyl hydrazine derivatives according to a concentration of a standard reference (butyl aldehyde).

(4) PDO (1,3-propanediol) Content (wt %)

About 0.5 g of the polytrimethylene ether glycol prepared in Example was dissolved in 10 mL of methanol, and measured by gas chromatography (model: agilent 7890, column: DB-WAX). About 1 g of 1,3-PDO was dissolved in 10 mL of methanol, and additionally diluted according to concentrations, and measured using a standard reference to calculate the 1,3-PDO content in the polytrimethylene ether glycol.

The results are shown in Table 1 below.

short path distillation, in which a condenser was installed inside a distillation column and an evaporation diameter and a surface area were 70 mm and 0.04 m², respectively. When a distillation column jacket was set at an appropriate temperature by a hot oil system and a vacuum level of about 0.001 torr~0.1 torr was formed inside the column by a vacuum pump, each of the previously prepared samples was introduced into the upper portion of distillation at an appropriate feed rate. At this time, the polytrimethylene ether

TABLE 1

|  | #1 | #2 | #3 | #4 | #5 | #6 | #7 | #8 | #9 |
|---|---|---|---|---|---|---|---|---|---|
| OHV | 52.56 | 52.07 | 54.11 | 56.00 | 54.96 | 52.41 | 56.62 | 55.89 | 56.19 |
| End-group average molecular weight (Mn) | 2135 | 2155 | 2074 | 2004 | 2042 | 2141 | 1982 | 2008 | 1997 |
| Dispersity | 2.1 | 2.0 | 2.1 | 2.2 | 2.1 | 2.1 | 2.3 | 2.2 | 2.2 |
| Carbonyl value (ppmw) | 340 | 320 | 380 | 400 | 380 | 360 | 430 | 380 | 390 |
| PDO content (wt %) | 0.05 | 0.04 | 0.055 | 0.07 | 0.065 | 0.05 | 0.09 | 0.08 | 0.09 |
| Oligomer content (wt %) | 0.8 | 0.7 | 0.9 | 1.8 | 1.6 | 2.4 | 3.5 | 2.9 | 3.2 |

As shown in Table 1, it was confirmed that although the polytrimethylene ether glycols were prepared in the same manner, distribution of each component was localized due to a polarity difference between polytrimethylene ether glycol, and 1,3-propanediol and oligomer. In particular, the number average molecular weight showed a variation up to 175 Dalton, and the molecular weight distribution was also different for each sample.

(Step 2)

Purification of each sample prepared in Step 1 was performed using a lab-scale thin film evaporation equipment. In detail, the thin film evaporation equipment was VKL-70-4 model manufactured by VTA, which is a kind of glycol formed a thin film having a uniform thickness inside the column by a mechanical stirrer equipped with a wiper. Evaporated low molecular weight materials were condensed in the internal condenser and discharged toward a distillate, and purified polytrimethylene ether glycol was discharged as a residue.

Thin film evaporation conditions applied to each sample were as in the following Table 2, and physical properties of the purified polytrimethylene ether glycol thus discharged were measured in the same manner as in Step 1, and results are shown in the following Table 2.

TABLE 2

| Feed sample | #1 | #2 | #3 | #4 | #5 | #6 | #7 | #8 |
|---|---|---|---|---|---|---|---|---|
| Feed rate (kg/hr) | 0.2 | 0.2 | 0.2 | 0.2 | 0.2 | 0.2 | 0.2 | 0.2 |
| Evap. Temp (° C.) | 150 | 160 | 170 | 180 | 190 | 200 | 210 | 220 |
| Condenser Temp. (° C.) | 35 | 35 | 35 | 35 | 40 | 40 | 40 | 40 |
| Vacuum level (torr) | 0.01 | 0.02 | 0.03 | 0.05 | 0.05 | 0.07 | 0.08 | 0.1 |
| Distillate (wt %) | 0.8 | 0.9 | 1.4 | 1.6 | 1.5 | 1.3 | 1.7 | 1.7 |
| Residue (wt %) | 99.2 | 99.1 | 98.6 | 98.4 | 98.5 | 98.7 | 98.3 | 98.3 |
| OHV | 52.05 | 51.67 | 51.71 | 51.29 | 51.52 | 51.20 | 50.89 | 51.13 |
| End-group average molecular weight (Mn) | 2156 | 2172 | 2170 | 2188 | 2178 | 2192 | 2205 | 2195 |
| Dispersity | 2.0 | 1.95 | 1.95 | 1.9 | 1.9 | 1.9 | 1.85 | 1.8 |
| Carbonyl value (ppmw) | 110 | 90 | 62 | 70 | 55 | 65 | 38 | 36 |
| PDO content (ppmw) | 52 | 37 | 32 | 34 | 20 | N.D. | N.D. | N.D. |
| Oligomer content (wt %) | 0.48 | 0.43 | 0.18 | 0.14 | 0.15 | 0.12 | 0.09 | 0.1 |

As shown in Table 2, it was confirmed that when the thin film evaporation process was applied, oligomer and PDO contents were decreased, and the variation of the number average molecular weight of polytrimethylene ether glycol was decreased to 50 dalton or less. Further, the carbonyl values representing the aldehyde contents were also greatly decreased, indicating that residual amounts of the reaction by-products were also significantly reduced.

The invention claimed is:

1. A polytrimethylene ether glycol having a molecular weight distribution (Mw/Mn), measured by gel permeation chromatography using polyethylene glycol as a standard material, of 1.8 to 2.1, wherein a content of oligomers having a number average molecular weight of 400 or less is 0.5 wt % or less.

2. The polytrimethylene ether glycol of claim 1, wherein a content of 1,3-propanediol is 100 ppmw or less.

3. The polytrimethylene ether glycol of claim 1, wherein a content of aldehyde is 300 ppmw or less.

4. The polytrimethylene ether glycol of claim 1, wherein an end-group number average molecular weight of the polytrimethylene ether glycol, measured by end-group analysis, is 400 to 4,000.

5. A method of preparing a polytrimethylene ether glycol, the method comprising the steps of:
preparing a product comprising polytrimethylene ether glycol by polymerizing 1,3-propanediol (Step 1); and
preparing purified polytrimethylene ether glycol by distilling the product under conditions of a temperature of 150° C. to 250° C. and a pressure of 0.001 torr to 2.0 torr (Step 2).

6. The method of preparing the polytrimethylene ether glycol of claim 5, wherein the temperature of Step 2 is 160° C. or higher and 220° C. or lower.

7. The method of preparing the polytrimethylene ether glycol of claim 5, wherein the pressure of Step 2 is 0.005 torr or higher and 0.1 torr or lower.

8. The method of preparing the polytrimethylene ether glycol of claim 5, wherein the distillation of Step 2 is thin film evaporation, falling film evaporation, or short path evaporation.

* * * * *